United States Patent [19]

McVaugh

[11] 4,369,576
[45] Jan. 25, 1983

[54] HAND-HELD CABLE CUTTER

[76] Inventor: Arthur K. McVaugh, 2009 Old Sumneytown Pike, Harleysville, Pa. 19438

[21] Appl. No.: 266,457

[22] Filed: May 22, 1981

[51] Int. Cl.³ .............................................. B26B 15/00
[52] U.S. Cl. .................................... 30/228; 91/216 R; 92/111; 92/117 A
[58] Field of Search .................. 30/228, 180, 90.1, 92; 92/110, 111, 112, 117 R, 117 A; 91/216 R; 81/301

[56] References Cited

U.S. PATENT DOCUMENTS 3,561,117  2/1971  Murbach ............................... 30/228

OTHER PUBLICATIONS

*Electrical World*, "Hydraulic Cutters", H. K. Porter, Inc., Mar. 9, 1964, p. 70.

Primary Examiner—Stephen G. Kunin
Assistant Examiner—Debra S. Meislin
Attorney, Agent, or Firm—Paul & Paul

[57] ABSTRACT

A portable hand-held hydraulically-operated cable cutter for severing electric and communication cables has a pair of cutter jaws, one fixed and one movable. The movable jaw is driven positively in both the closing and opening directions by a piston-cylinder assembly under the control of the lineman. The piston is fixed; the cylinder is movable. The movable cutter jaw is connected pivotally to the movable cylinder. The lineman holds the tool in one hand, using a fixed grip handle, and with the other hand controls operation of the movable cutter jaw by rotating a cylindrical control handle in one direction or the other. As a safety lock, the tool has an offset trigger which must be pressed to unlock the control handle before it can be rotated. When the control handle is released, it is automatically returned to its neutral position by a torsion spring, thereby instantly stopping any motion of the cutter jaws in either the opening or closing directions. The speed at which the cutter jaws open or close may be regulated by means of the control handle. The tool is operated from the hydraulic system of the line truck or from any other suitable open hydraulic system.

5 Claims, 11 Drawing Figures

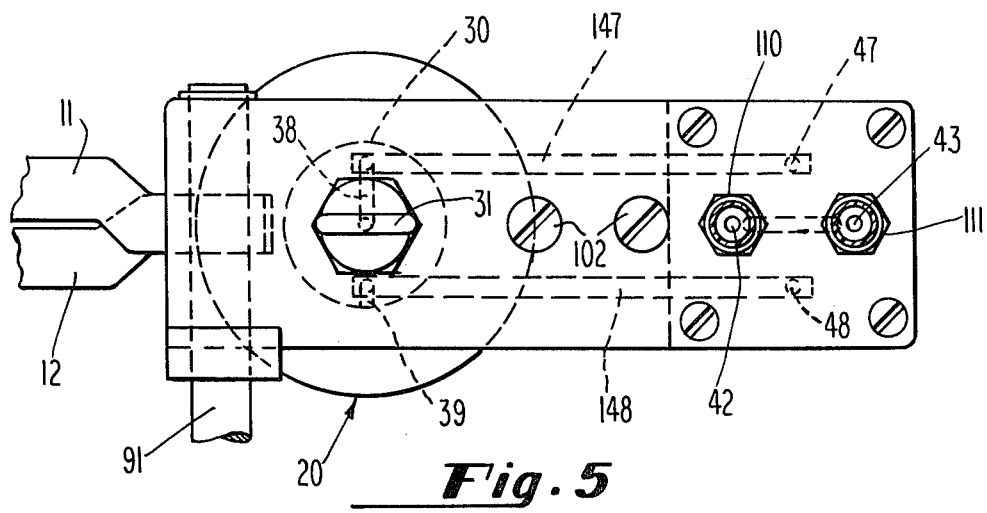
Fig. 5
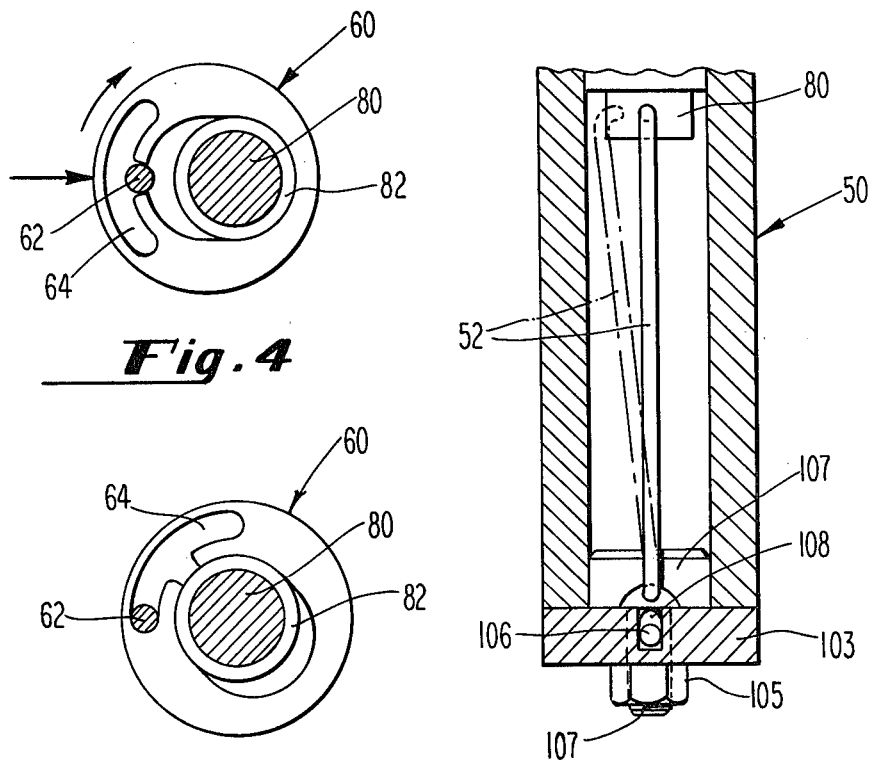
Fig. 4
Fig. 4A
Fig. 8

HAND-HELD CABLE CUTTER

BACKGROUND OF THE INVENTION

Linemen who install, maintain and remove electric, telephone and other communication cables located in either aerial or underground positions are frequently called upon to sever a cable. Most of the cables are lead sheathed and contain either a large number of relatively small conductors or a fewer number of larger conductors. The conductors may be copper or aluminum, and sometimes include steel strands. The severance of such a cable requires considerable force, and there is need for a light-weight hand-held power-driven cable cutter capable of being operated by the hydraulic system of the line truck.

SUMMARY OF THE INVENTION

The object of the present invention is to provide a light-weight hand-held hydraulically operated cable cutter adapted for cutting lead sheathed cables having copper, aluminum or other conductors, and located in either aerial or underground locations.

Another object of the invention is to provide a hand-held cable cutter tool, as described above, which has provisions for making the tool safe to use for its intended purpose.

Another object is to provide a cable cutter tool, as described above, in which the operation of the tool is controlled by but one hand of the lineman, leaving his other hand free to hold the tool.

Another object is to provide a cable cutter tool, as described above, having means for controlling the speed at which the cutter jaws close or open.

The foregoing objects are achieved by providing a tool which, in its presently preferred form, weighs about 24 pounds; measures 14" long by 12¾" high by 3⅛" wide; has 3½" jaws for a clean shear through lead, copper and aluminum cables; is operable up to 2500 PSI directly from the hydraulic system of the line truck or from any other suitable open hydraulic system; has positive drive in both the opening and closing directions; stops movement immediately upon release of the control handle; has a wrist control with a built-in safety trigger; has variable hydraulic-fluid flow control so that the speed of the cutter jaws may be regulated; provides 12,000 pounds of cutting effort; is adapted for use in any kind of weather; requires little maintenance because the hydraulic system is fully enclosed; and is ready for use by merely hooking up the hydraulic lines.

BRIEF DESCRIPTION OF THE DRAWINGS

FIG. 4 is a plan view of the off-set trigger as seen looking down along the line 4—4 of FIG. 3. In FIG. 4 the trigger is shown in locked position.

FIG. 4A is a plan view similar to FIG. 4 but showing the off-set trigger in unlocked position.

FIG. 5 is a plan view of the manifold or valve block, as seen looking down along the line 5—5 of FIG. 3.

FIG. 8 is an elevational view of the control handle, as seen looking along the line 8—8 of FIG. 3.

DETAILED DESCRIPTION OF THE PREFERRED EMBODIMENTS

Figure 1:
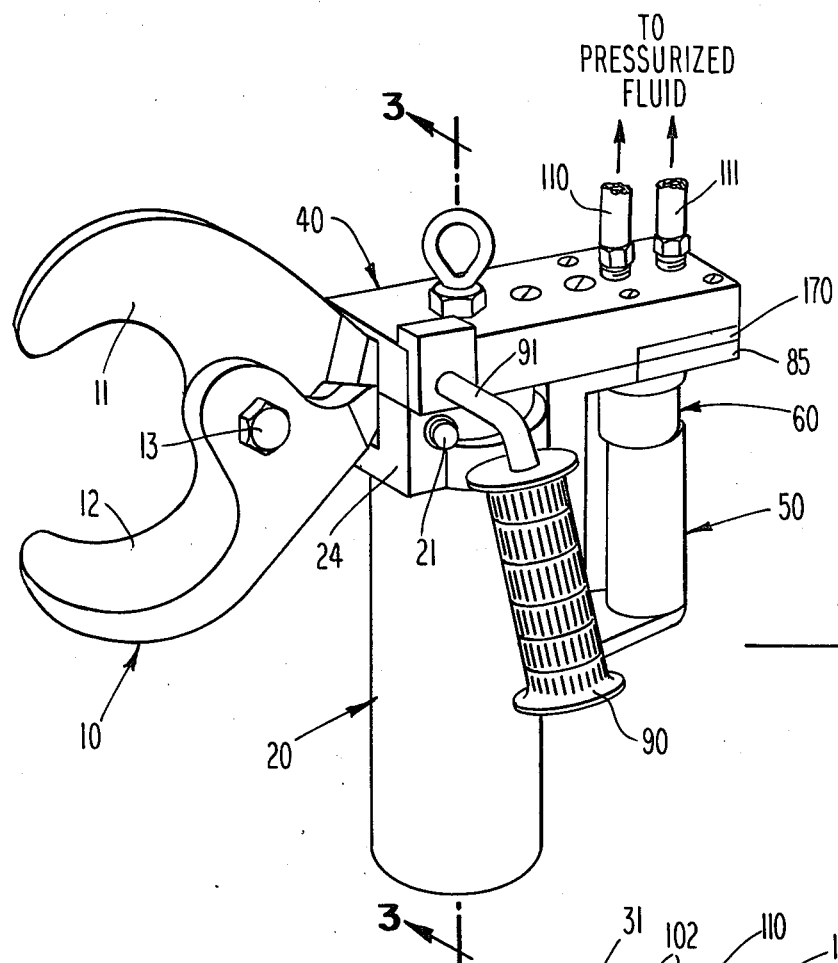
FIG. 1 is a perspective view of a cable cutter tool according to the present invention.
Figure 2:
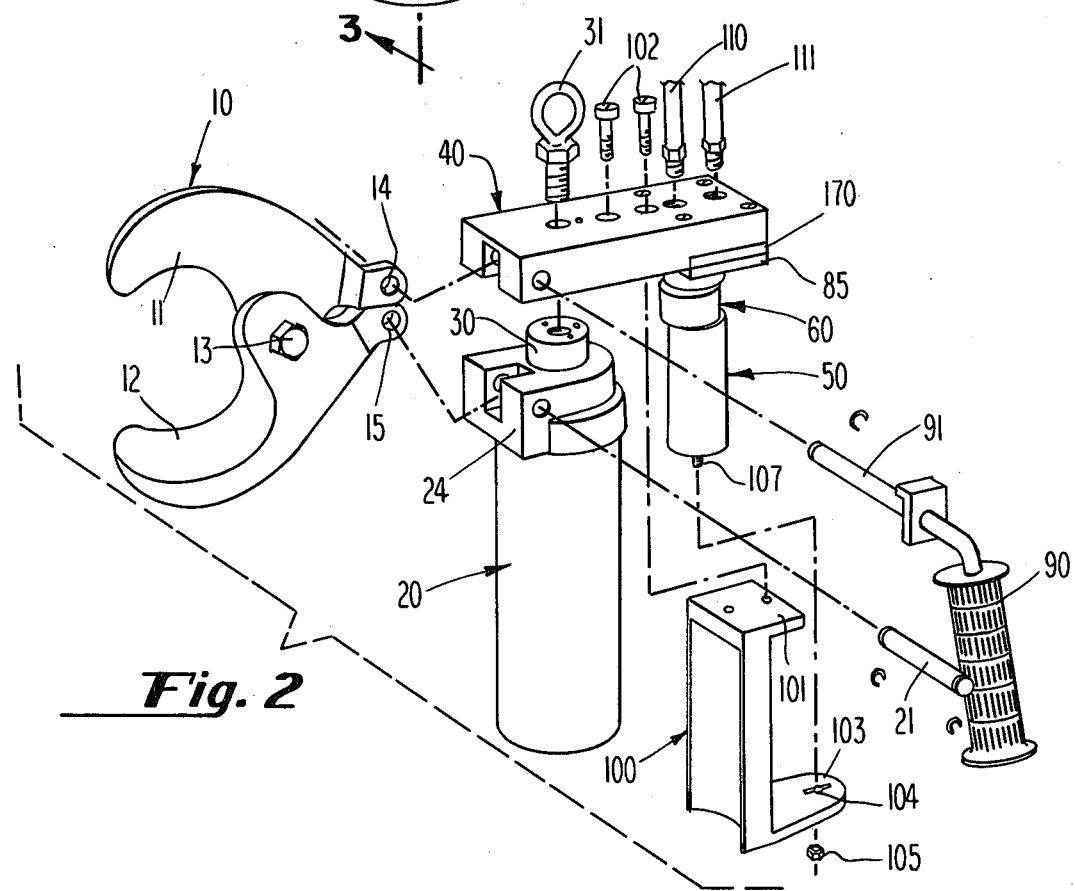
FIG. 2 is an exploded perspective view of the cutter tool of FIG. 1.

Referring now to FIGS. 1 and 2, the hand-held hydraulic cable cutter, in a preferred embodiment, comprises a pair of cutter jaws 10, the upper jaw 11 being pivotally fixed about shank 91 of handle 90 and the lower jaw 12 being pivotal about pivot bolt 13.

Fixed jaw 11 has an ear-like portion 14 at its inward end which is connected, as by the shank 91 of angled handle 90 to the body of manifold 40.

The inward end of movable cutter jaw 12 has an ear-like extension 15 which is connected pivotally, as by pin 21, to the cap 24 of cylinder 20. Fitted within cylinder 20 is a piston rod 30 the upper end of which projects through cylinder cap 24 and is connected by an O-bolt 31 to manifold 40. Thus, piston rod 30 is fixed, while cylinder 20 is movable up and down on the piston rod, as will be further described.

Also connected to manifold 40, on the underside thereof, is a support 100 which as best seen in FIG. 2, has an upper flange 101 which is connected to the underside of manifold 40 by screws 102. At the lower end of support 100 is a shelf 103 which projects outwardly beyond flange 101. Shelf 103 supports a cylindrical control handle 50, which in turn supports an offset trigger 60. Control handle 50 is connected to shelf 103 by a pivot 107 which extends through a hole 104 in shelf 103. The projecting end of pivot 107 receives a nut 105. Control handle 50 is secured to shelf 103 but it is pivotal relative thereto by reason of a pin 106 (FIGS. 3 and 8) which prevents pivot 107 from rotating with respect to shelf 103.

Figure 3:
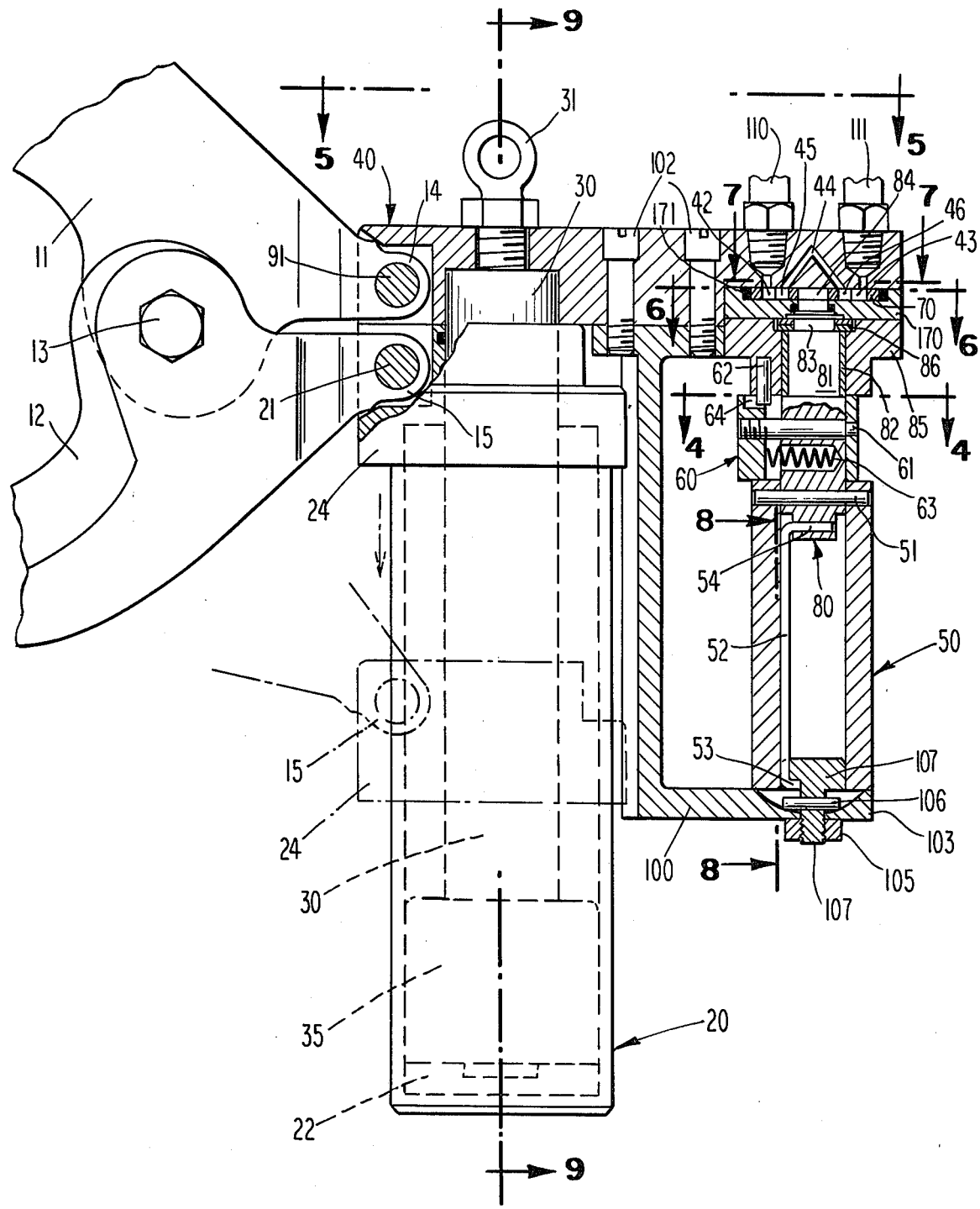
FIG. 3 is an elevational view, in section, as seen looking along the line 3—3 of FIG. 1.

A pair of hydraulic hoses 110,111 are connected to the upper side of manifold 40. As best seen in FIG. 3, the hose connection to manifold 40 is in an area located in vertical alignment with the control handle 50 and offset trigger 60. Located between manifold 40 and offset trigger 60 is a valve housing 170 having a circular recess 171 which receives a disc valve element 70. Located below housing 170 and above the offset trigger 60 is a bearing housing 85.

A spool 80 is located vertically within the center cores of control handle 50 and offset trigger 60 and is pinned to 50 and 60 by pins 51 and 61, respectively. Offset trigger 60 is held in an eccentric position relative to control handle 50 by a compression spring 63. Spool 80 extends above trigger 60 into and through bearing housing 85 and into and through valve housing 170. At its upper portion, spool 80 is stepped down in several steps, first to a portion 81 of reduced diameter which is rotatable in cylindrical bearing 82. Then spool 80 further reduces to a still smaller diameter portion 83 which rotates in washer bearings 86, and finally, at its uppermost end, spool 80 terminates in a square end 84 which fits snugly into a square hole 71 in the center of disc valve element 70. See FIGS. 6, 7, and 7A. Thus, when spool 80 is rotated through a fraction of a revolution in one direction or the other by the wrist action of the lineman on control handle 50, valve element 70 is driven in a corresponding manner. The maximum rotation is 45° in each direction from the neutral position shown in FIG. 6. This rotational limit is determined by the length of slot 64 in trigger 60 as seen in FIGS. 4 and 4A.

Figure 6:
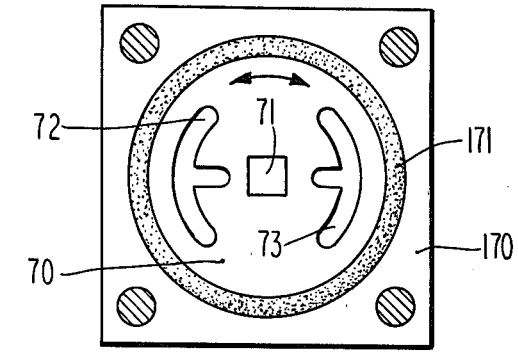
FIG. 6 is a plan view of the rotatable disc valve element, as seen looking down along the line 6—6 of FIG. 3.

As seen in FIG. 6, disc valve element 70 sits within a circular recess 171 in valve housing 170. Its square hole 71 receives the square end of drive spool 80. Disc valve element 70 has a pair of opposed slots 72 and 73 each of which has a circumferential portion and a radial portion. In each slot, the radial portion extends inwardly from the center of the circumferential portion.

Figure 7:
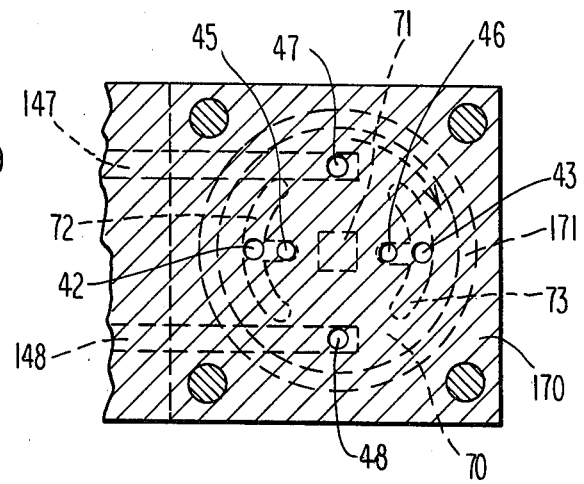
FIG. 7 is a plan view, in section, of a portion of the manifold or valve block as seen looking down along the line 7—7 of FIG. 3. The disc valve element is shown in dotted lines in its neutral position.

FIG. 7 is a view taken along the line 7—7 of FIG. 3 and shows a portion of manifold 40 just above the upper surface of valve element 70. Thus, FIG. 7 shows the four ports in manifold 40 which are also seen in FIG. 3. As seen in FIG. 3, manifold 40 has a feed or IN port 42 and a return or OUT port 43 to which the hydraulic hoses 110,111 are respectively connected. In addition, manifold 40 has a V-shaped cross duct 44 which terminates in ports 45 and 46.

As illustrated in FIG. 7, when the valve element 70 is in its neutral position, all four ports 42,43,45 and 46 of manifold 40 are exposed and in communication with slots 72 and 73 of the valve element 70.

Figure 7A:
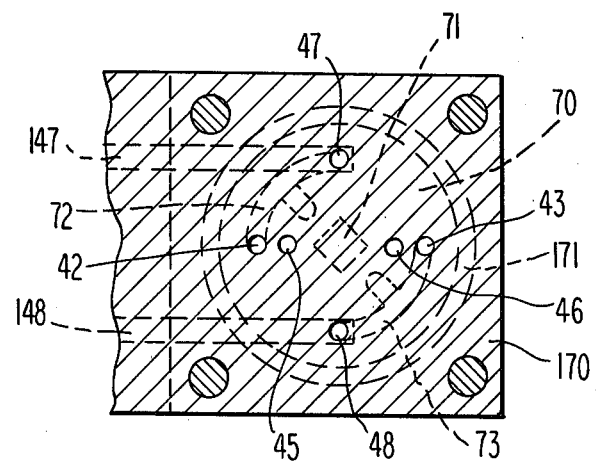
FIG. 7A is a view similar to that of FIG. 7 but showing the disc valve element in one of its active positions wherein hydraulic fluid pressure is applied to the cylinder chamber below the piston head to close the cutter jaws.

In FIG. 7A, valve element 70 is illustrated as having been rotated clockwise 45° from the neutral position shown in FIG. 7. As a result, ports 45 and 46 have been covered while ports 47 and 48 have been uncovered. Thus, communication with ports 45 and 46 of the cross-duct 44 has been cut off and communication established with ports 47 and 48. As seen in FIG. 5, ports 47 and 48 are at the terminating ends of ducts 147 and 148 in manifold 40. Ducts 147 and 148 communicate respectively with ducts 38 and 39 in piston rod 30.

Figure 9:
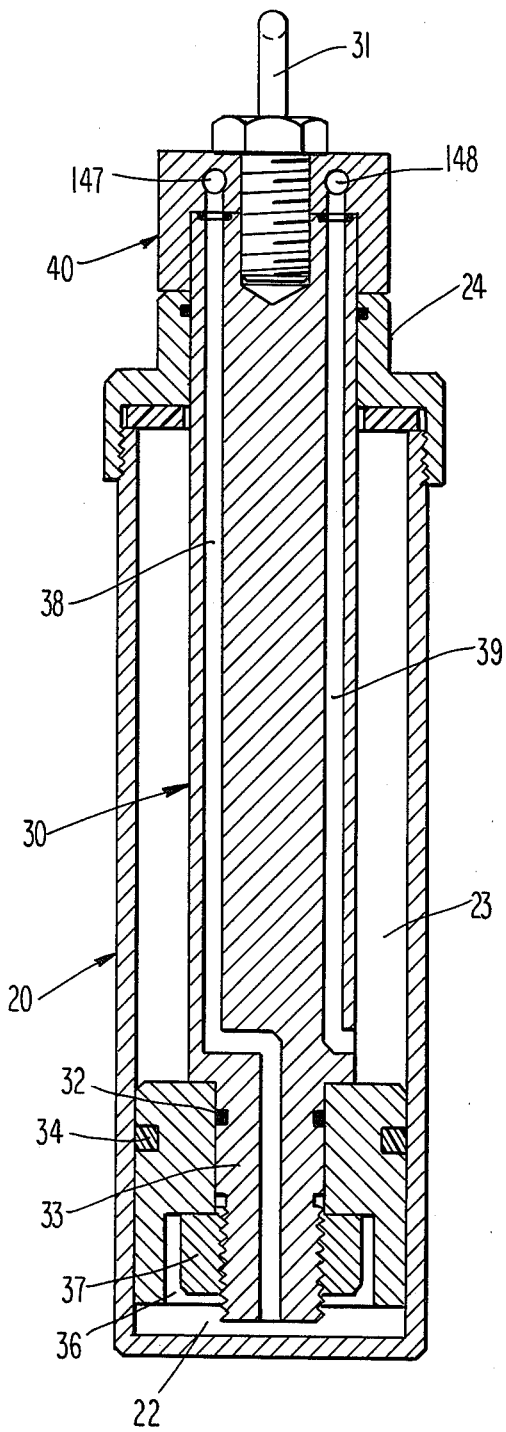
FIG. 9 is a view, in section, of the piston and cylinder.

FIG. 9 is an elevational view, in section, of cylinder 20 and piston rod 30. The threaded lower end of O-bolt 31 extends through a hole in manifold 40 and is received within a threaded hole in the upper end of piston rod 30. O-bolt 31 also functions as a lift ring for lifting the tool by hand or by means of a rope which may be passed through the ring for lowering and raising the tool into and out of a manhole, and/or for raising and lowering the tool to and from an aerial cable line.

The lower end portion 33 of piston rod 30 is of reduced diameter and is externally threaded. Fitted over the reduced diameter portion 33 is a piston head 35 having inner and outer O-rings 32 and 34. The lower end of piston head 35 is provided with a recess 36 which receives nut 37 which is used to secure the piston head 35 to the piston rod 30.

Extending downwardly through the cylindrical body of piston rod 30 are a pair of fluid ducts 38 and 39. Duct 38 extends all the way down and through portion 33 to below piston head 35 and communicates with cylinder chamber 22 located below the piston head 35. The other fluid duct 39 communicates with cylinder chamber 23 located above the piston head 35.

FIGS. 3 and 8 show the torsion spring 52 which functions to return the control handle 50 rotationally to its neutral or OFF position whenever the control handle 50 is released by the lineman. As seen in FIGS. 3 and 8, control handle 50 is secured to shelf 103 of support 100 by a pivot 107 and a nut 105. A cross pin 106, received within a slot 108 in shelf 103, passes through pivot 107 and prevents rotation of pivot 107 relative to shelf 103 when the lineman turns the control handle 50 rotationally in one direction or the other. Pivot 107 is provided with an L-shaped slot which receives the lower hook end 53 of torsion spring 52. The upper hook end 54 of torsion spring 52 is received within a transverse hole in the lower end of spool 80. Thus, when the lineman rotates the control handle 50, the spool 80, which is pinned by pin 51 to control handle 50, also rotates, and so does the upper end 54 of torsion spring 52. However, since the lower end 53 of torsion spring 52 does not rotate, being held in fixed pivot 107, the spring 52 is placed under torsional stress such that the spring tries to return spool 80 to its original position, and does so the moment the lineman releases the control handle 50.

OPERATION

To operate the cable cutter, the lineman will ordinarily hold the tool in his left hand by the handle 90 and support the tool by the control handle 50 with his right hand. He will then place the open jaws of the cable cutter over the cable to be cut so that the cutting edge of fixed jaw 11 rests on the upper side of the cable. The lineman, using the index finger of his right hand, will then press or squeeze the off-set trigger 60 to move it from its spring-biased eccentric position to a position concentric with control handle 50. This moves trigger lock pin 62 out of its locking recess into the circumferentially curved portion of slot 64 and allows the off-set trigger 60 to be rotated, as shown in FIG. 4A. Since trigger 60 and control handle 50 are each pinned to spool 80, pressing trigger 60 into its unlocked concentric position also allows control handle 50 to be rotated. Rotation of control handle 50 in one direction causes the cutter jaws to close. Rotation of control handle 50 in the opposite direction causes the cutter jaws to open. How this is accomplished will now be further described.

To close the jaws and cut the cable, the lineman, using his right hand, turns the control handle 50 clockwise through a maximum of 45 degrees. In so rotating the control handle 50, spool 80 is correspondingly rotated and, since the upper square end of spool 80 is fitted snugly within the square opening 71 in valve element 70, valve element 70 is also correspondingly rotated. This moves the valve element 70 from the neutral or OFF position shown in FIGS. 6 and 7 to the CLOSE JAWS position shown in FIGS. 7A.

In the neutral or OFF position, pressurized hydraulic fluid is applied through hose 110 to the IN port 42. This fluid pressure is applied through port 45, cross duct 44, and port 46 to OUT port 43, and then through hose 111 back to the source of pressurized fluid.

When, however, valve element 70 is rotated clockwise from the OFF position shown in FIG. 7 to the CLOSE JAWS position shown in FIG. 7A, the ports 45 and 46 at the ends of the cross duct 44 become covered by the solid material of the disc valve element 70, while ports 47 and 48 become exposed in the circumferential slots 72 and 73, respectively. Thus, fluid communication is established between IN port 42 and port 47, and also between port 48 and OUT port 43. As a result, pressurized hydraulic fluid flows through IN port 42, valve slot 72, port 47, duct 147 in manifold 40 (FIG. 5) and down fluid duct 38 in piston rod 30. This fluid discharges into lower chamber 22 in cylinder 20 located below piston head 35. Since piston rod 30 and piston head 35 are fixed against movement by lift-ring 31, cylinder 20 is forced to move downwardly on the piston rod 30. This reduces the volume of upper chamber 23 located in cylinder 20 above piston head 35. As a result, fluid is forced upwardly through duct 39 in piston rod 30, out through duct 148 in manifold 40, into port 48, through valve slot 73 and out through OUT port 43 to the return hose 111.

When cylinder 20 is driven downwardly, as just described, pin 21 (FIG. 2) is pulled downwardly, thereby pulling downwardly ear 15 of lower jaw 12 and causing jaw 12 to pivot clockwise about pin 21 and also about pivot bolt 13. Bolt 13 moves downwardly along an arcuate path causing upper jaw 11 to pivot counterclockwise about shank 91. In this manner, the jaws 11,12 of the cable cutter are closed and the cable is severed.

If the cable cut as described above happens to be a multi-conductor cable, the ends of the individual cables will occasionally jam the cutter jaws, preventing the jaws from opening unless a positive opening force is applied. To apply such a positive opening force, after the lineman has cut through the cable, he rotates the control handle 50 in the opposite or counterclockwise direction through 90° to an OPEN JAWS position located 45° beyond the neutral or OFF position. While the OPEN JAWS position is not specifically illustrated, it will be understood that in this position, port 47 is connected by valve slot 73 to OUT port 43, while port 48 is connected by valve slot 72 to IN port 42. As a result, pressurized fluid is applied from hose 110 through IN port 42, valve slot 72, port 48, duct 148 in manifold 40, and duct 39 in piston rod 30 to the upper chamber 23 of cylinder 20. This causes the volume of upper chamber 23 to expand and causes cylinder 20 to move upwardly, thus moving lower jaw 12 in a counterclockwise direction, thereby opening the jaws of the cutter. When cylinder 20 moves upwardly in the jaws-closing direction, hydraulic fluid returns from lower chamber 22 through duct 38, duct 148, port 48, valve slot 73, and OUT port 43 to return hose 111.

The speed at which the cutter jaws 11,12 are closed and open may be varied and controlled by the lineman by means of control handle 50. An inspection of FIGS. 7 and 7A will show that when the valve element 70 is moved rotationally from its OFF position shown in FIG. 7, to its CLOSE JAWS position shown in FIG. 7A, that the cross ports 45 and 46 are gradually covered and that the ports 47 and 48 leading to the piston-cylinder are gradually uncovered by the slots 72,73. At any given moment, to the extent that ports 47 and 48 are less than fully uncovered, there is less than full flow of pressurized hydraulic fluid to the piston-cylinder assembly and accordingly the cylinder moves more slowly than it does when the ports 47 and 48 are fully uncovered and there is full flow of pressurized fluid. Stated briefly, the flow of pressurized hydraulic fluid to the piston-cylinder assembly may be metered by the lineman by means of the control handle 50, thereby controlling the speed at which the jaws of the cutter close and open.

The cable cutter has been described as being hydraulically operated. This is the preferred method of operation. However, the cable cutter may readily be adapted for pneumatic operation, and in the claims which are appended hereto, the term "fluid" is to be understood to include a gas as well as a liquid.

What is claimed is:

1. A hand-held fluid-drive cable-cutter tool comprising:
  a. a pair of cutter jaws one of which is pivotally fixed and the other of which is pivotally movable;
  b. a manifold having fluid passageways and input and return ports;
  c. fixed means connecting said fixed jaw pivotally to said manifold;
  d. a piston rod having fluid ducts therein;
  e. fixed means securing one end of said piston rod to said manifold;
  f. a piston head on the other end of said piston rod;
  g. a piston cylinder concentric with and movable axially relative to said piston rod;
  h. means connecting said cylinder pivotally to said movable cutter jaw;
  i. a control handle;
  j. support means supporting said control handle from said manifold;
  k. a trigger;
  l. spring means biasing said trigger to a position eccentric with respect to said control handle, said trigger being movable manually from said eccentric position to a position concentric with said control handle;
  m. a drive spool coaxially disposed within said control handle, said spool extending through said trigger and projecting therebeyond;
  n. means connecting said spool to said control handle;
  o. means connecting said spool to said trigger;
  p. a disc valve element having fluid ports and fluid slots;
  q. a valve housing supporting said valve element for rotational movement, the projecting end of said spool being connected to said valve element so that rotational movement of said control handle provides corresponding rotational movement of said valve element;
  r. fluid feed lines extending from a source of pressurized fluid to said input and return ports in said manifold;
  s. a first of said fluid ducts in said piston rod extending from said one end of said piston rod to the other end of said piston rod beyond said piston head;
  t. a second of said fluid ducts in said piston rod extending from said one end of said piston rod to a side surface of said piston rod before said piston head;
  u. said fluid passageways in said manifold extending from said first and second fluid ducts in said piston rod to first and second ports in said disc valve element;
  v. said slots in said valve element providing direct communication from said manifold input port to said return port when said valve element is in the OFF position;
  w. said slots in said valve element providing communication between said manifold input and return ports and said manifold passageways when said valve element is in either of two drive positions.

2. A cable cutter according to claim 1 wherein latch means are provided for inhibiting rotational movement of said trigger when said trigger is in its biased eccentric position.

3. A cable cutter according to claim 1 wherein torsion spring means are provided on said control handle for returning said control handle to the OFF position.

4. A cable cutter according to claim 1 wherein said control handle and trigger are each cylindrical.

5. A hand-held hydraulic cable-cutter tool comprising:
- a. a pair of cutter blades one of which is pivotally fixed and the other of which is pivotally movable relative to said fixed blade;
- b. a manifold having first and second fluid passageways and input and return ports;
- c. a pin connecting said pivotally fixed jaw to said manifold;
- d. a fixed piston rod having first and second fluid ducts therein;
- e. a lift-ring bolt securing one end of said piston rod to said manifold;
- f. a piston head on the other end of said piston rod;
- g. a movable piston cylinder concentric with and movable axially relative to said fixed piston rod;
- h. means connecting said movable cylinder pivotally to said movable cutter blade;
- i. a cylindrical control handle having OFF and drive positions;
- j. support means supporting said control handle from said manifold;
- k. a cylindrical trigger adjacent said control handle;
- l. spring means biasing said trigger to a position eccentric with respect to said control handle, said trigger being movable manually from said eccentric position to a position concentric with said control handle;
- m. latch means holding said trigger against rotational movement when said trigger is in its eccentric position;
- n. a cylindrical drive spool coaxially disposed within said control handle, said spool extending through said trigger and projecting therebeyond and terminating in an end portion of square cross section;
- o. pin means connecting said spool to said control handle;
- p. pin means connecting said spool to said trigger;
- q. a disc valve element having first and second fluid ports and first and second fluid slots, and a square central aperture for receiving said square end portion of said drive spool;
- r. a valve housing supporting said valve element for rotational movement in response to rotational movement of said control handle;
- s. fluid feed lines extending from a source of pressurized fluid to said input and return ports in said manifold;
- t. said first fluid duct in said piston rod extending from said one end of said piston rod to the other end of said piston rod beyond said piston head;
- u. said second fluid duct in said piston rod extending from said one end of said piston rod to a side surface of said piston rod before said piston head;
- v. said first and second fluid passageways in said manifold extending respectively from said first and second fluid ducts in said piston rod to said first and second ports in said valve element;
- w. said first and second slots in said valve element providing direct communication from said manifold input port to said return port when said control valve is in its OFF position;
- x. said slots in said valve element providing communication between said manifold input and return ports by way of said first and second manifold passageways and said first and second fluid ducts in said piston rod when said valve element is in either of two drive positions, and
- y. torsion spring means having one end fixed to said handle-support means and the other end fixed to said drive spool for returning said control handle to its OFF position.

* * * * *